Jan. 1, 1963
A. FETZ
3,071,679
WELDING ORGANIZATION
Filed March 9, 1961
FIG. 1
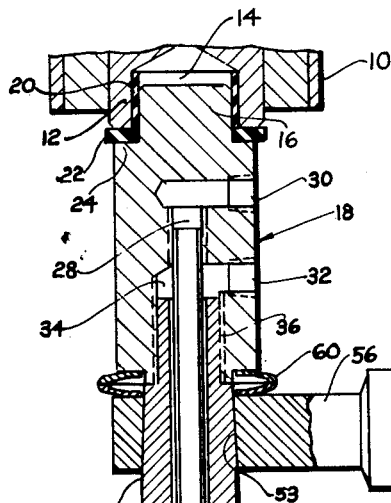
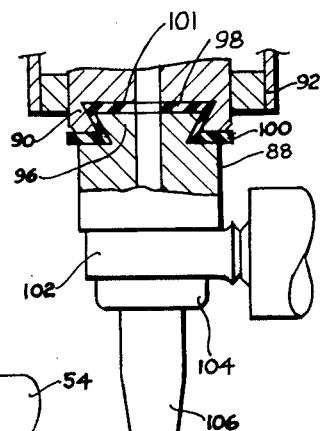
FIG. 4
FIG. 2
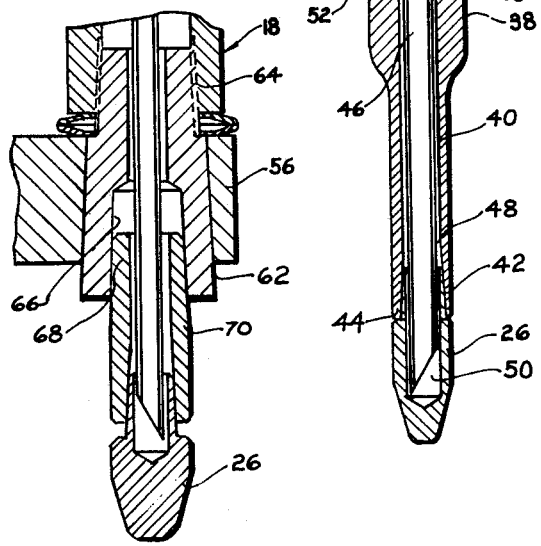
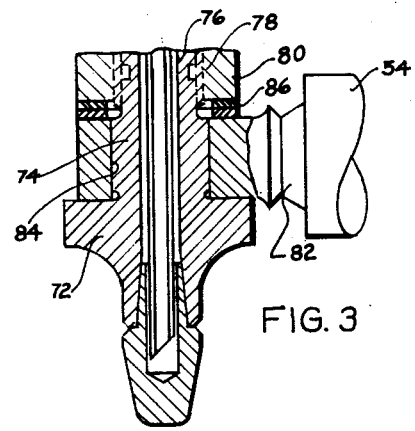
FIG. 3
INVENTOR.
ALFRED FETZ
BY
Barnes, Kisselle, Raisch & Choate : 3,071,679
Patented Jan. 1, 1963

3,071,679
WELDING ORGANIZATION
Alfred Fetz, 18905 Barlow, Detroit 5, Mich.
Filed Mar. 9, 1961, Ser. No. 94,638
9 Claims. (Cl. 219—120)

This invention relates to a resistance welder construction and more particularly to an improvement in spot welding machines with specific reference to the manner in which the power cable is electrically connected to the electrode of the welder and insulated from the remainder of the welder. This application is a continuation-in-part of my copending application Serial No. 738,354, filed May 28, 1958, now Patent No. 2,975,264, dated March 14, 1961.

It is an object of this invention to provide a resistance welder arrangement that enables the power cable to be connected directly with the electrode or electrode adapter of the welder so that a most efficient electrical connection, namely, copper-to-copper, can be obtained.

A further object of the invention is to provide in conjunction with the improved cable connection arrangement a rubber follow-up means which insulates the portion of the welder adjacent the electrode through which the current is caused to flow) from the remainder of the welding machine.

In the drawings:

FIG. 1 is a fragmentary sectional view of a spot welding machine in accordance with the present invention.

FIG. 2 is a fragmentary vertical sectional view of a modified form of cable connection according to the present invention.

FIGS. 3 and 4 are views partly in section showing further modified constructions for the cable connection and rubber follow-up means.

In the arrangement illustrated in FIG. 1, the welding end of a spot welding machine is illustrated. This includes a cylinder 10 in which is arranged a piston having a rod 12 as illustrated in my copending application. Rod 12 is formed at its free end with a counterbore 14 in which the upper reduced end 16 of a rod extension 18 is mounted. A rubber sleeve 20 is arranged between the inner annular face of counterbore 14 and the cylindrical outer face of the reduced end 16 of rod extension 18. An annular rubber pad 22 is likewise arranged between the end of rod 12 and the shoulder 24 of rod extension 18. Pad 22 is preferably thicker than sleeve 20 and in any event, is sufficiently thick so that when welding pressure is applied to the top side of the piston in cylinder 10 and the electrode 26 is engaged with a work piece, pad 22 is compressed. Pad 22 and sleeve 20 are cemented, vulcanized, or otherwise suitably secured to rod extension 18 and rod 12 so that the extension 18 is integrally connected to the piston assembly.

Rod extension 18, which is formed of steel, has an axially extending bore 28 intersected by radially extending inlet and outlet passageways 30 and 32, respectively, for conducting coolant to the electrode 12. The lower end of bore 28 is radially enlarged as at 34 and has a threaded connection as at 36 with an electrode adapter 38. Electrode adapter 38 is provided with an axial bore 40 which is tapered at its lower end as at 42 so as to receive the upper tapered end 44 of electrode 26. Within the axial bores 34 of extension 18 and 40 of adapter 38, there is arranged a deflector tube 46. Deflector tube 46 has an outer diameter less than bore 40 so as to provide a clearance space 48 therebetween. The lower end of deflector tube 46 is likewise smaller than the axially extending blind bore 50 of electrode 26 so that coolant can be introduced through inlet 40 down through deflector tube 46 and return to the outlet port 32 through the clearance space 48.

Adapter 38 and electrode 26, as is conventional, are formed of copper. The intermediate body portion of adapter 38 is tapered or conically shaped as at 52. The power cable 54 has a copper lug 56 at the end thereof having a tapered opening 58 therein of a size to telescope over and into tight engagement with the conical portion 52 of adapter 38. Between the upper face of lug 56 and the lower end of rod extension 18, there is arranged a compressible spring washer 60, preferably of the Belleville type.

In assembling the arrangement illustrated in FIG. 1, lug 56 is slipped over the upper end of adapter 38 so that the tapered hole 58 therein engages the conical outer surface 52 of adapter 38. Thereafter, adapter 38 is threaded upwardly into the threaded bore of rod extension 18. As the adapter is tightened into rod extension 18, the spring washer 60 is compressed and assures a tight fit between lug 56 and the tapered portion 52 of adapter 38.

The arrangement illustrated in FIG. 1 possesses several desirable features. In the first pace, it will be observed that the particular form of cable connection illustrated results in a very good electrical condition; namely, copper-to-copper contact with ample surface contact between the lug 56 and adapter 38. Furthermore, when welding pressure is applied to piston 12 while electrode 26 is in engagement with the work piece to be welded, rubber pad 22 is compressed. As soon as the resistance of the electrical current flowing through the welding end of electrode 26 and the underlying portion of the work piece produces a momentary melting of the spot being welded, rubber pad 22 produces an instantaneous follow-up action which maintains the welding pressure of the electrode against the work piece. Thus, pad 22 produces a desirable follow-up action from a point closely adjacent the electrode of the welder and at the same time, in conjunction with sleeve 20, insulates the rod extension 18 together with the electrode 26 and adapter 38 from the remainder of the welding machine and particularly the piston-cylinder assembly. Thus, pad 24 and sleeve 20 provide a simple and expedient means for insulating the electrically conducting portions of the welder from the remainder of the welder and eliminate the possibility of shorting out the piston assembly and the cylinder 10.

The arrangement illustrated in FIG. 2 is similar to that shown in FIG. 1. In the arrangement illustrated in FIG. 2, the lug 56 of the power cable likewise has a tapered through opening 58 which engages the similarly tapered, outer conical surface of an electrode mounting sleeve 62 which is threaded upwardly into the lower end of piston extension 18 as at 64. The electrode mounting sleeve 62 has an enlarged tapered bore 66 at its lower end in which the tapered upper end 68 of a sleeve type electrode adapter 70 is arranged to engage. The piston rod extension 18 illustrated in FIG. 2 is designed to mount on the lower end of a piston rod in the manner illustrated in FIG. 1. In the arrangement illustrated in FIG. 2, lug 56, electrode mounting sleeve 62, adapter 70 and electrode 26 are all formed of copper whereas the piston rod extension 18 is formed of steel.

In FIG. 3, a further modified arrangement is shown wherein the electrode adapter 72 is formed with a cylindrical boss 74 and a reduced upper end 76 which threads into the lower end of the threaded bore as at 78 of piston rod extension 80. The lug 82 of power cable 54 is formed with a cylindrical through opening 84 having a diameter which is only sufficiently greater than the diameter of the cylindrical boss 74 of electrode adapter 72 to enable the cable lug to be telescoped thereover. To assemble the arrangement illustrated in FIG. 3, lug 82 is slipped over the cylindrical boss 74 of adapter 72 and the upper end 76 of the adapter is threaded into the lower end of the piston extension 80. A pair of spacer washers 86 are arranged between the lower end of piston extension 80 and the upper face of cable lug 82. As in the previous embodiments described, the arrangement illustrated in FIG. 3 enables a direct copper-to-copper connection from the cable to the electrode and ample contact surface is provided. Also, as is the case with the two previous embodiments described, the piston extension 80 is designed for connection with the lower end of a piston by means of a rubber pad and sleeve as shown in FIG. 1.

The arrangement shown in FIG. 4 illustrates a modified form of connection between a rod extension 88 and the lower end of a piston rod 90 arranged to reciprocate within a cylinder 92. In this arrangement, the lower end of rod 90 is fashioned with a dovetail slot and the upper end face of piston extension 88 is formed with a dovetail guide 96. A molded rubber insert 98 is located between these members and is cemented, vulcanized or otherwise secured thereto. The horizontally extending portions 100 and 101 of insert 98 provide a compressible pad for producing the desireable follow-up during the welding operation.

In this arrangement, the cable lug 102 is clamped between the lower end of piston rod extension 88 and electrode adapter 104. The electrode 106 mounts in adapter 104 in a manner similar to the previous forms illustrated and described. In the arrangement illustrated in FIG. 4, it will be noted that the molded rubber insert 98 provides a compressible follow-up means at a point located closely adjacent the electrode and also insulates the electrically conducting portion of the welder from piston 90. Likewise, the cable lug 102, which is formed of copper, is connected directly to the electrode adapter 104 which is also formed of copper and thereby provides the excellent electrical condition previously referred to.

I claim:

1. In a spot welding machine, a cylinder, a piston assembly reciprocable in said cylinder, an electrode assembly, said piston and said electrode assemblies having juxtaposed end faces and resilient means interposed between and engaging said juxtaposed end faces.

2. The combination called for in claim 1 wherein said resilient means comprises the means connecting the piston assembly with the electrode assembly.

3. The combination called for in claim 2 wherein said resilient means comprises a rubber pad.

4. In a spot welding machine, a cylinder, a piston in said cylinder having a rod portion projecting out one end of the cylinder, an electrode assembly mounted on the end of said rod portion by means which are resilient in a direction axially of the longitudinal axis of the cylinder, the end of said rod portion and the adjacent end of the electrode assembly being formed with interengaged dovetail slot and dovetail guide and said resilient means comprising a rubber pad interposed between the interengaged faces of the dovetail slot and guide.

5. In a spot welder, the combination of a cylinder, a piston in said cylinder having a rod portion extending out one end of the cylinder, an electrode assembly mounted on said rod portion, a rubber pad interposed between the rod portion and the electrode assembly and insulating the rod portion from the electrode assembly and means on said electrode assembly for connecting an electric power cable thereto.

6. The combination called for in claim 5 wherein said electrode assembly comprises a rod extension on which said rubber pad is secured, an electrode adapter mounted on said rod extension, an electrode mounted on said adapter, said adapter having a shank portion intermediate its end for receiving an apertured power cable lug and an apertured power cable lug telescoped over said shank portion of the adapter and in contact therewith for establishing a path for electric current to the electrode.

7. In a spot welder, the combination of a mounting member for an electrode assembly, an electrode assembly secured to the mounting member, said electrode assembly including an electrode adapter secured to said mounting member, said adapter having a shank portion, a power cable having a lug at one end thereof, said lug being apertured to receive said shank portion and establish a direct electrical connection between the lug and the electrode adapter and an electrode on said adapter, said apertured lug and said shank portion being correspondingly tapered and means between the mounting member and the adapter adapted to press said lug into firm engagement with the tapered shank portion of the adapter when the adapter is mounted on the mounting member.

8. In a spot welder, the combination of a mounting member for an electrode assembly, an electrode assembly secured to the mounting member, said electrode assembly including an electrode adapter secured to said mounting member, said adapter having a shank portion, a power cable having a lug at one end thereof, said lug being apertured to receive said shank portion and establish a direct electrical connection between the lug and the electrode adapter and an electrode on said adapter, said apertured lug and said shank portion being correspondingly tapered and wherein said mounting member is formed with an axially extending bore, said adapter being formed with an axial extension threaded into said bore and resilient means acting between the end of the mounting member and said lug for urging the lug onto the tapered shank portion of the adapter when the adapter is threaded into the mounting member.

9. In a spot welder, the combination comprising a mounting member for an electrode assembly, said mounting member having an axially threaded bore, an electrode adapter having a threaded end portion threaded into said bore, said adapter having a radially outwardly projecting shoulder spaced axially from the threaded end thereof, a power cable provided with a lug, said lug being engaged between said shoulder and said mounting member and an electrode on said adapter.

References Cited in the file of this patent

UNITED STATES PATENTS

| | | |
|---|---|---|
| 1,273,203 | Thomson | July 23, 1918 |
| 2,332,789 | Gann | Oct. 26, 1943 |
| 2,452,010 | Woodward | Oct. 19, 1948 |
| 2,714,150 | Kaiser | July 26, 1955 |
| 2,883,516 | Bek | Apr. 21, 1959 |